Feb. 28, 1933.   A. H. SHONKWILER ET AL   1,899,776
MEANS FOR PREVENTING SCALE IN ANNEALING FURNACES
Filed Aug. 24, 1929   4 Sheets-Sheet 1

INVENTOR
Albert H. Shonkwiler
Justin W. Macklin,
By: Justin W. Macklin
ATTORNEY

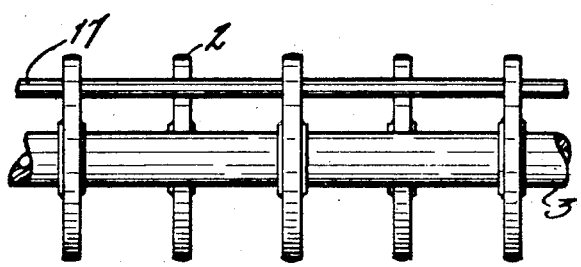
Fig. 4.
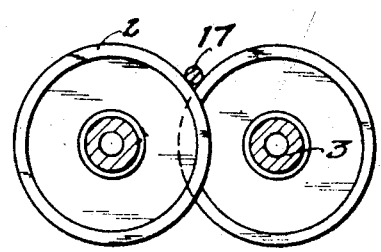
Fig. 5.
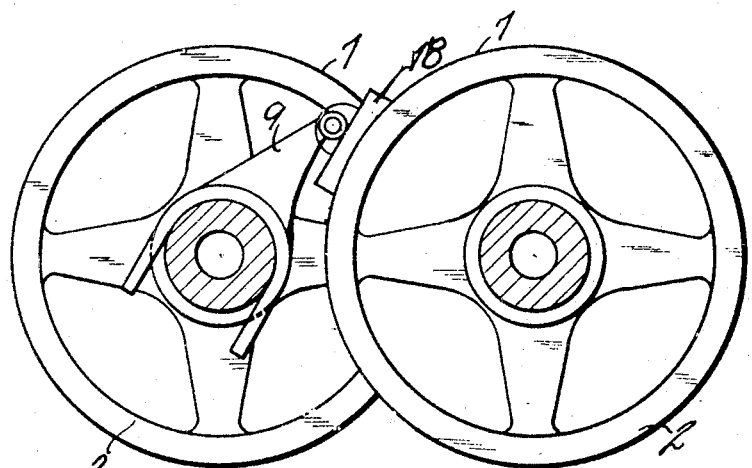
Fig. 6.
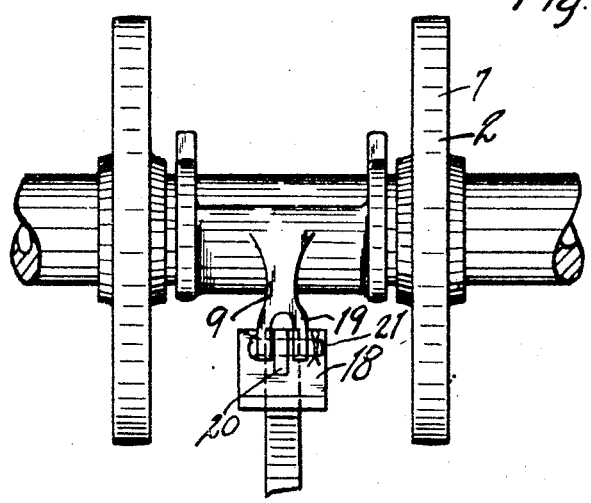
Fig. 7.
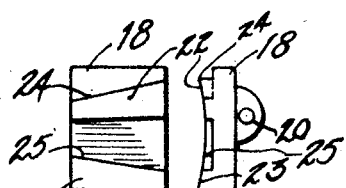
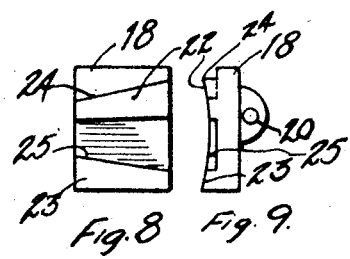
Fig. 8.    Fig. 9.

Feb. 28, 1933. A. H. SHONKWILER ET AL 1,899,776
MEANS FOR PREVENTING SCALE IN ANNEALING FURNACES
Filed Aug. 24, 1929 4 Sheets-Sheet 4

INVENTOR
Albert H. Shonkwiler
Justin W. Macklin,
BY Justin W. Macklin
ATTORNEY

Patented Feb. 28, 1933

1,899,776

UNITED STATES PATENT OFFICE

ALBERT H. SHONKWILER AND JUSTIN W. MACKLIN, OF LAKEWOOD, OHIO, ASSIGNORS TO THE OTIS STEEL COMPANY, OF CLEVELAND, OHIO, A CORPORATION OF OHIO

MEANS FOR PREVENTING SCALE IN ANNEALING FURNACES

Application filed August 24, 1929. Serial No. 388,143.

This invention relates to the prevention of scale in continuous steel treating furnaces and more particularly to a method of and apparatus for preventing the accumulation of scale on the conveying rollers and treated material.

It is well known that in continuous furnaces the usual manner of passing the sheets through the furnace is by means of a series of power actuated rollers. However, due to the heating of the rollers and the high temperature of the sheets, there is a tendency for scale and foreign matter to accumulate or fuse onto the rollers, which results in cutting or scratching the sheets. Since these scratches are longitudinal, they are difficult, and in most cases impossible to remove, either by rolling or pickling the sheet.

By eliminating these difficulties, single sheets may be passed through such a furnace without the necessity of rider sheets, thus saving the great expense of heating twice the amount of sheets to a high temperature. The rider sheets must be returned for re-use, requiring great increase in manual handling, which would be unnecessary if sheets could be passed through the furnace without scraping or marking by the rollers. Furthermore, the rider sheets themselves become so burned and bent that they can be used only a limited number of times whence new sheets must be supplied.

One of the principal objects of our invention is to overcome the disadvantages mentioned, and thus dispense with the use of rider sheets and to increase the capacity of the furnace by preventing the accumulation of scale or foreign matter on the conveying rollers of the furnace.

Another object is to prevent accumulation of scale or foreign matter on the conveying rollers and sheets by means of an apparatus which is cheaply and easily constructed, and which can be used on any continuous furnace without material change in the structure of the furnace, and without the use of any additional parts other than the device itself.

A further object is to eliminate scale and irregularities on the sheets and conveying rollers at a very small cost by an apparatus which can be installed and removed for replacement and repair, while the furnace is in operation, and which can be used in the high temperature zones of the furnace, thus avoiding any material increase in the power required for operating the conveying rollers.

A still further object is to provide a scale removing device which is so arranged that, with no change in or addition to the furnace, it protects the conveying rollers shafts and in turn is cooled by the same cooling means, which cool such shafts and are ordinarily in use in continuous furnaces.

Other purposes and objects will become apparent from the following specification in which reference is made to the drawings, like numerals designating the same parts in different views.

In the drawings—

Fig. 4 is a front elevation of another form of our invention.

Fig. 5 is a side elevation of Fig. 4.

Figs. 6 and 7 are a side elevation and plan respectively of still another modified form.

Figs. 8 and 9 are a plan and elevation respectively of the contact scale eliminating element shown in Figs. 6 and 7.

Figure 1:
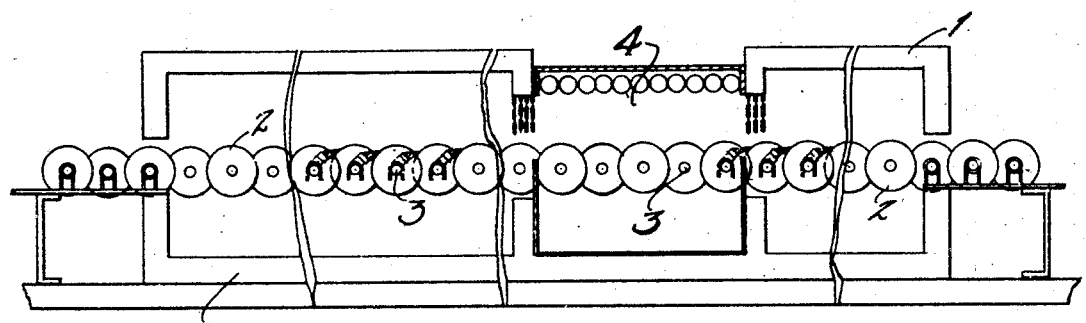
Fig. 1 is a diagrammatic sketch of such a continuous heat treating furnace.

Referring to the drawings, a form of continuous annealing furnace 1, having a series of conveying rollers 2 mounted on the usual hollow water cooled shafts 3, is diagrammatically shown, with the addition of a quick quenching compartment 4, the purpose and object of which is fully described in the application of Shanafelt et al., filed June 22, 1929, Serial No. 372,812.

This furnace is arranged in such a manner as to retain within its various chambers a non-oxidizing atmosphere which to some extent prevents appreciable scaling of the treated material, as is fully set forth in the above cited application.

Figure 2:
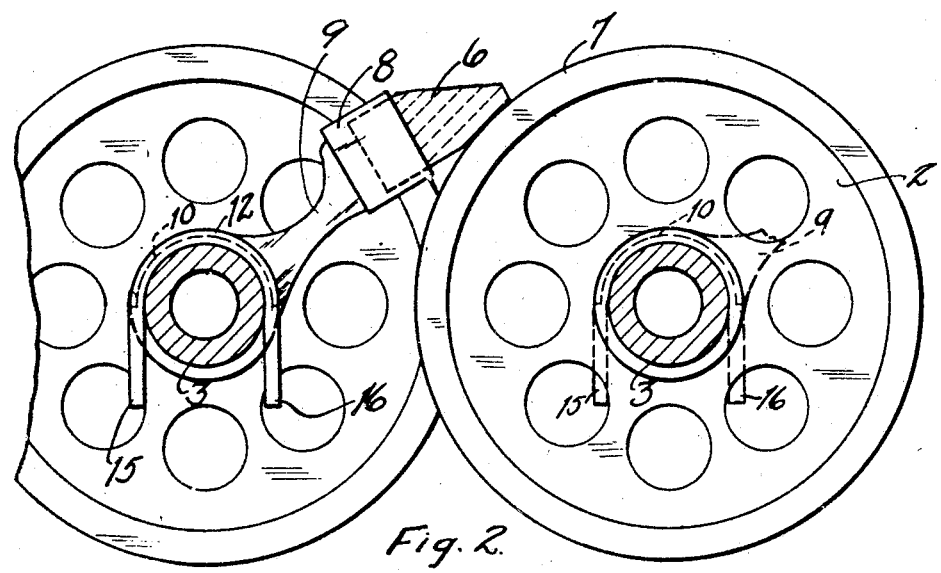
Fig. 2 shows a preferred form of our invention.
Figure 3:
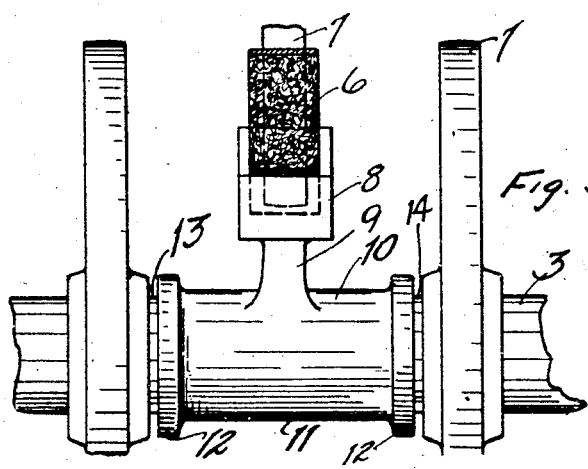
Fig. 3 is a plan view of the form shown in Fig. 2.

A desirable form of apparatus for physically preventing surface irregularities is more clearly illustrated in Figs. 2 and 3. An abrasive shoe 6 adapted to lie against the circumference 7 of an adjacent roller 2, is there shown. A convenient and economical abrasive shoe may be formed by using a refractory brick, as illustrated. This abrasive shoe 6 is supported in operating position against the circumference 7 of the adjacent conveying roller by suitable means.

A preferred form of such means having numerous advantages and special features which will be discussed later is illustrated and includes a cuplike head piece 8, formed to receive the abrasive shoe 6 and affixed to an arm 9. This arm in turn is mounted upon a skeleton bearing 10, which includes a central, moderately light cylindrical shell portion 11, the inner diameter of which is slightly greater than the diameter of the shaft 3. The ends 12 of shell 11 may be in the form of bearing rings and loosely engage the shaft. The length of shell is such that there is a small amount of clearance, such as at 13 and 14 between the bearings and the conveying roller hubs adjacent to each respectively, so that it may float longitudinally. Projecting arms, such as at 15 and 16 may be formed on each bearing ring to prevent the bearings and shell from becoming disengaged from the shaft. If desired, the entire apparatus may be cast in one piece.

A transverse bar 17, such as shown in Figs. 4 and 5 will prevent the formation of scale on the conveying rollers 2 when laid between adjacent sets, but as it wears, it has a tendency to wedge into the relative converging surfaces, and in this and in other respects is unsatisfactory.

A form of abrasive shoe or scraper 18, such as illustrated in Figs. 6, 7, 8 and 9 may be substituted for the shoe 6 above discussed. If such be used, the arm 9 would be slightly changed, so as to provide a pivotal connection for the shoe 18. Such connection includes a yoke 19, engaging a tongue 20 and a pin 21, shown secured in place as by a cotter pin.

The abrasive surfaces 22 and 23 of the shoe 17 are illustrated in Figs. 8 and 9, with forward edges 24 and 25 disposed at an angle to each other and to the elements of the circumference 7 of the conveying rollers 2. Such an arrangement would cause a lateral as well as a direct tangential thrust upon any rough projection on the rim 7, thus giving a camming action and dampening any tendency to vibration.

Figure 10:
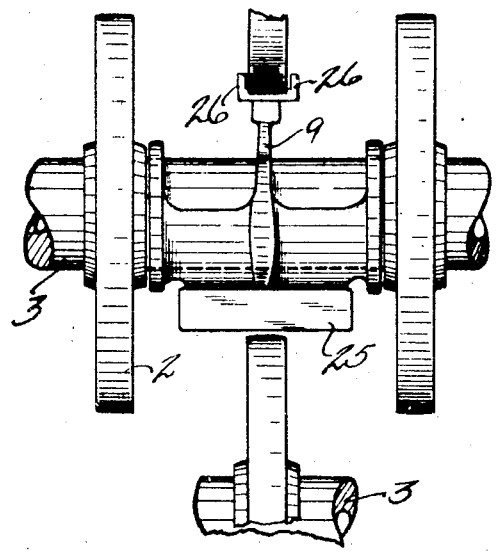
Figs. 10 and 11 are a plan and elevation respectively of a modified form of the device shown in Fig. 2.
Figure 11:
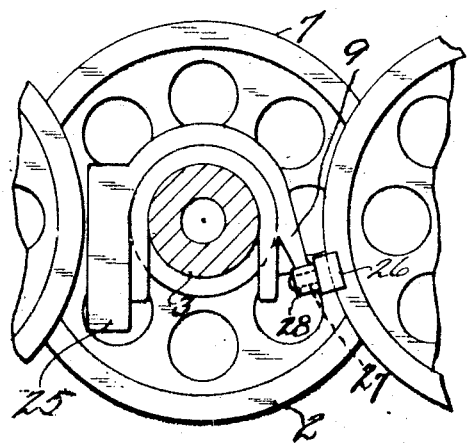

The clearance between the material being conveyed on the conveying rolls and shafts of the conveying rolls might be so small in case of small rollers that it would be difficult to locate the abrasive shoe and arm as described. However, such a difficulty can easily be overcome by the slight changes in the form of the apparatus, a suitable alteration being illustrated in Figs. 10 and 11. This is accomplished simply by dropping the arm 9 downwardly so that the abrasive shoe engages the conveying roller below the center. In such an arrangement, the shoe tends to fall away from the conveying roller so a counterweight 25 must be provided to force it into contact with the wheel. This counterweight may be cast in one piece with the bearing and arm. Although the abrasive shoes previously described may be used, another suitable form is shown, formed with guide flanges 26 and a projecting element 27 which fits into an eye 28 on the arm 9.

Figure 12:
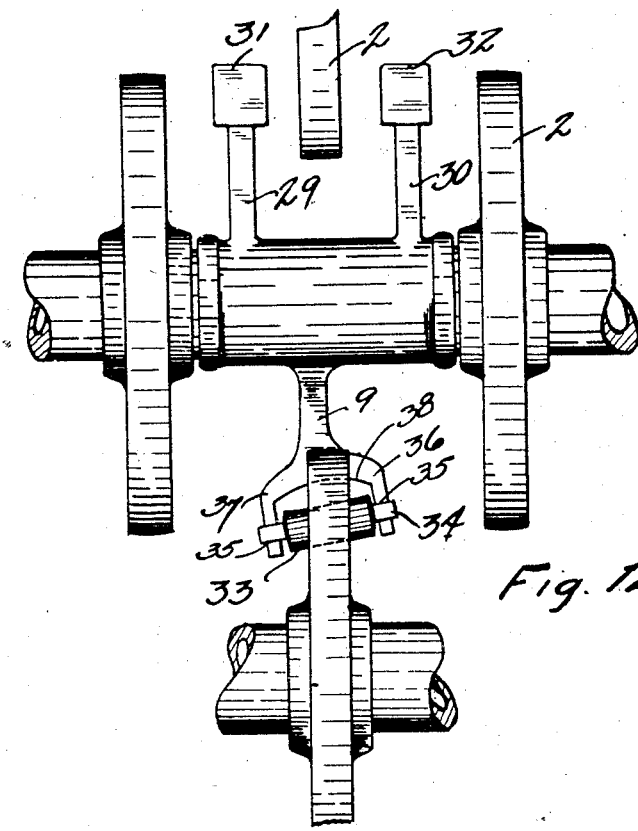
Figs. 12 and 13 are a plan and elevation respectively of a slight modification of the device shown in Figs. 10 and 11.
Figure 13:
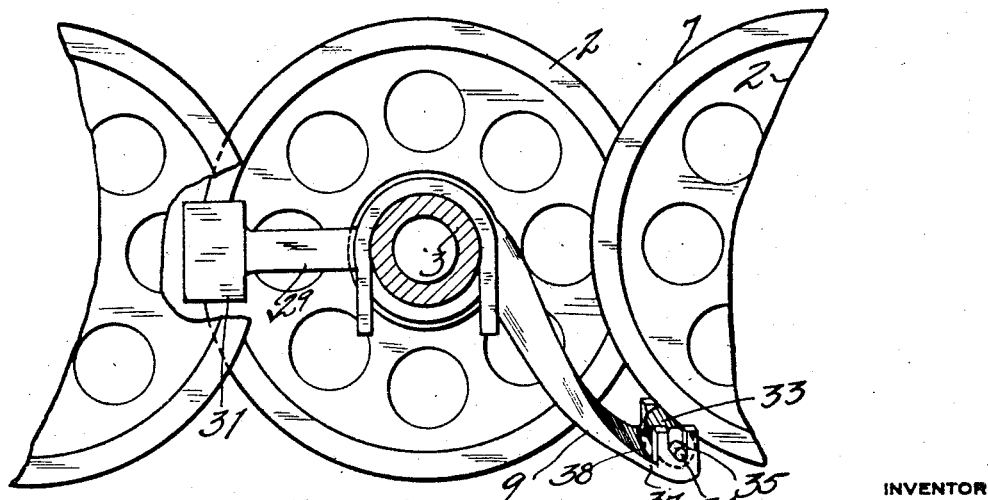

Figs. 12 and 13 illustrate another method of overcoming the disadvantage of limited space when required. This method includes the use of arms 29 and 30 staggered relative to the conveying rollers 2, the ends of which carry or are enlarged to form counterweights 31 and 32 to hold the shoe in contact with the conveying rollers.

Figure 14:
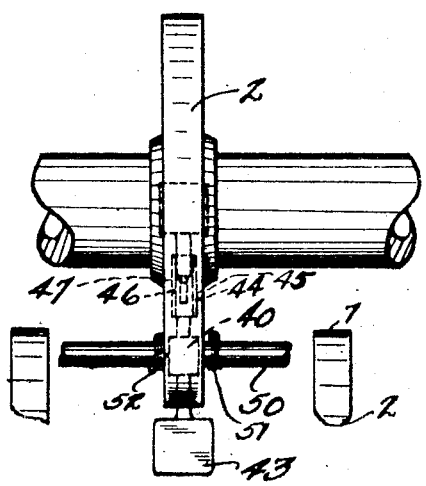
Figs. 14 and 15 are a plan and elevation respectively of a modified form of our scale removing apparatus.
Figure 15:
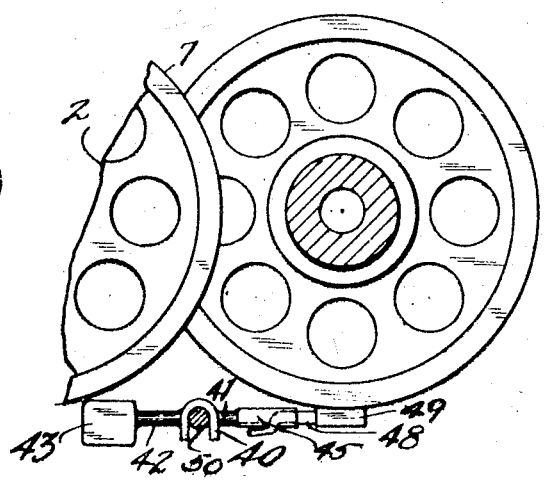

Another advantageous abrasive shoe is shown, in the form of a roller 33, having a shaft 34 which, for ease in replacement, rests loosely in U-shaped openings 35 in the arms 36 and 37 of the yoke 38 carried by the arm 9.

Where there is very limited clearance between adjacent conveying rolls of one set and the shafts of adjacent sets, as well as between the rolls of each shaft, conveying rolls themselves are small, a modified arrangement, such as illustrated in Figs. 14 and 15, may be used. A suitable form includes one or more bearing bands 40 on which are formed arms 41 and 42. One of these arms, here 42, has an enlarged end 43 which forms a counterbalance. The end of arm 44 is flattened somewhat and portions turned to form upwardly projecting flanges 45 and 46. An opening 47 is provided in this flattened portion into which fits the arm 48 of the shoe 49, which arm is bent so as to pass through the opening and engage part of the underside of the flattened portion of the arm while part of the arm 48 rests on the upper side of the flattened portion, thus locking loosely in place.

This form of scale preventing and eliminating apparatus, however, must be supported by different means from those previously described, such, for example, as a supplementary shaft 50, the lateral position of the apparatus being shown as retained by use of pins, as at 51 and 52.

It will have been noted that both the abrasive shoe and the supporting means should be formed of heat resisting material.

While the apparatus herein described is especially useful in non-oxidizing continuous furnaces, it may of course be used in any type of continuous metal treating furnaces.

The scale or foreign matter tends to fuse onto the conveying rollers in the relative higher temperature portions of the furnace. When these sections have been determined by any of the usual means, such as a pyrometer, the scale preventing apparatus herein described may be installed. Suitable small openings with refractory doors may easily be installed at intervals in the side walls of the furnace at very small cost.

To install the scale removers, it is only necessary to grip the same in ordinary long handled tongs and drop them across the shafts 3 of the conveying rollers at these predetermined sections. Obviously, removing them for repairs or replacement may be accomplished as easily. In fact, the mere delay of a few seconds in feeding material into the furnace allows a sufficient gap between sheets and sufficient time to make the installation or change.

After the shell bearings have been dropped across the shaft 3, between any two adjacent conveying rollers on the shafts, they automatically assume the correct position, due to the spacing of the bearings 12, by the width of the shell portion 11. The slight clearance between the conveying rollers and bearings 12 permits the entire apparatus to fall into position, without possibility of binding and also permits it to move to and fro along the shaft within a slight range. This latter action prevents rapid wearing and grooving of the abrasive shoe. The clearance between the shell portion 11 and the shaft 3 forms an air pocket which tends to protect the shaft 3 from high temperatures. The apparatus itself remains at a temperature somewhat below that in the furnace, due to the cooling action of the water cooled shaft on which its bearings rest.

By using the apparatus only in such portions as are necessary, a minimum increase in power for actuating the conveying rollers is required.

After the apparatus has been thus easily dropped on the shafts 3, the abrasive shoe naturally falls into the correct position for rubbing the rim surface of the conveying rollers, and rests comparatively lightly in place, due to its own weight or that of the counterweights. It makes no difference whether the conveying rollers are rotated toward or away from the abrasive shoe, as the holders are so formed that the apparatus cannot jam the rollers if the shoe should by chance become disengaged.

Since the apparatus has been installed before any appreciable irregularities have been formed on the rollers, it is obvious that very slight abrasive action is required to remove such formation and prevent its recurrence. Likewise, in such high temperature, the scale or foreign matter is not so tightly affixed to the rollers as is the case when such has cooled on them.

While we have described our apparatus in connection with continuous furnaces, we do not mean to limit ourselves to use only in combination with such, but mean to include its use with metal forming rollers, and other apparatus which employs rolls which must be kept smooth or polished.

We claim:

1. In a continuous furnace having conveying rollers and a number of parallel shafts therefor, means carried by said shafts and bearing on conveying rollers on another shaft for preventing the formation of irregularities on the rim surfaces of said rollers.

2. In a continuous annealing furnace having conveying rollers and shafts therefor, means for mechanically preventing the formation of irregularities on the rim surfaces of the conveying rollers, said means including scraping edges, each disposed at an angle to the elements of the rim surfaces and to the direction of rotation and at an angle to each other whereby lateral thrusts are balanced.

3. In a continuous annealing furnace having conveying rollers and a number of parallel shafts therefor, means for mechanically preventing the formation of irregularities on the rim surfaces of the conveying rollers, said means including a scraping element, bearing means detachably engaging the roller shaft and relatively rotatable therewith and supporting said scraping element.

4. In a continuous annealing furnace having conveying rollers and shafts therefor, means for mechanically preventing the formation of irregularities on the rim surfaces of the conveying rollers, said means including a wiping element, a yoke supporting said wiping element and in spaced relation to said shaft, bearing surfaces on said yoke detachably engaging said shaft and being separated a distance less than adjacent rollers on said shaft, whereby said wiping means are floatingly supported on said shaft and engage a roller on an adjacent shaft.

5. In a continuous annealing furnace having conveying rollers and parallel shafts therefor, means for mechanically preventing the formation of irregularities on the rim surfaces of the conveying rollers, said means including a scraping element, a yoke bearing in floating engagement with said roller shaft and relatively rotatable therewith and floatingly supporting said scraping element, said scraping element engaging the rim surface of a conveying roller on an adjacent parallel shaft.

6. In a continuous annealing furnace having conveying rollers and shafts therefor, means for mechanically preventing the formation of irregularities on the rim surfaces of the conveying rollers, including abrasive elements, means detachably engaging said shafts to support said elements in contact with the rim surfaces of the rollers of adjacent shafts at an angle to the direction of rotation of the periphery of said rollers.

7. In a continuous annealing furnace having conveying rollers therein, means for continuously removing irregularities on the rim surfaces of the conveying rollers while the furnace is in operation including rotatably mounted abrasive elements in continuous peripheral contact with said rollers, each of said elements turning on an axis at an angle to that of its roller and being of different diameter from the conveying roller with which it is in contact.

8. In a continuous annealing furnace having conveying rollers therein, means for continuously removing irregularities on the rim surfaces of said rollers while the furnace is in operation and the rollers are in a highly heated state, including a portion of refractory bricks as abrasive elements, one for each roller, and means to support said elements in continuous peripheral contact with the rollers, said means including a cuplike container detachably engaging each of said bricks, said container being angular to fit the brick end and said brick being held in said container by gravity and the rubbing action of an aligned roller.

9. In a continuous annealing furnace, having rollers therein for conveying sheets and the like therethrough by rolling contact with the sheets, means for continuously removing irregularities on the rim surfaces of the conveying rollers including an element for each roller in constant contact therewith, and positioned to permit the free passage of the sheets or the like, whereby irregularities are prevented from forming or are removed from the rim surfaces of the rollers while the furnace is in operation and the sheets or the like are being passed therethrough.

10. In a continuous annealing furnace, having conveying rollers therein adapted to support sheets or the like on the upper surfaces thereof and move them through the furnace, of means for removing and preventing formation of irregularities on the rim surfaces of the conveying rollers while the furnace is in operation, including an element in contact with the rim surface of each roller, means supporting said elements in such contacting position below the path of the sheets of material being conveyed through the furnace, and said means being arranged to cause gravity to hold the elements in said contacting positions.

In testimony whereof, we hereunto affix our signatures.

ALBERT H. SHONKWILER.
JUSTIN W. MACKLIN.